(12) United States Patent
Wu et al.

(10) Patent No.: US 7,240,176 B2
(45) Date of Patent: Jul. 3, 2007

(54) APPARATUS AND METHODS FOR PLACING A MANAGED HEAP

(75) Inventors: Gansha Wu, Beijing (CN); Guei-Yuan Lueh, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 538 days.

(21) Appl. No.: 10/837,126

(22) Filed: May 1, 2004

(65) Prior Publication Data
US 2005/0246402 A1 Nov. 3, 2005

(51) Int. Cl.
*G06F 12/02* (2006.01)
(52) U.S. Cl. .................... 711/170; 707/206
(58) Field of Classification Search ............. 711/170; 707/206
See application file for complete search history.

(56) References Cited

U.S. PATENT DOCUMENTS

| | | | | |
|---|---|---|---|---|
| 6,832,302 | B1 * | 12/2004 | Fetzer et al. | 711/170 |
| 7,149,870 | B2 * | 12/2006 | Blandy | 711/173 |
| 2004/0003014 | A1 * | 1/2004 | Nagarajan et al. | 707/206 |
| 2005/0132162 | A1 * | 6/2005 | Reese et al. | 711/170 |

* cited by examiner

*Primary Examiner*—Jack A. Lane
(74) *Attorney, Agent, or Firm*—Hanley, Flight & Zimmerman, LLC

(57) ABSTRACT

Methods and apparatus are disclosed to intelligently place a managed heap in a memory. An example method disclosed herein identifies a current boundary of a static data region in memory, and sets a lower boundary of the managed heap at an address located a safeguard distance above the identified current boundary of the static data region in memory. Other embodiments may be described and claimed.

31 Claims, 9 Drawing Sheets

```
63 checkcast #25 <Class SomeClass>

401cf274  mov    r12, 0xC8
 401cf278  orr    r12, r12, 0xCB00
 401cf27c  orr    r0,  r0, r12, 0x1000
 401cf280  blx    r12
           \—514              518 —/
```

FIG. 5 (a) (Prior Art)

```
63 checkcast #25 <Class SomeClass>

4cd3ac        bl 0x1cbc8
  \—516         520 —/
```

FIG. 5 (b)

```
 401cf274  mov   r12, 0x68
 401cf278  orr   r0,  r0, 0x2c00
 401cf27c  orr   r0,  r0, 0x100000
 401cf280  orr   r0,  r0, 0x41000000
                              616 —/
```

FIG. 6 (a) (Prior Art)

```
  4cd3ac     mov   r0, 0x12c00
  4cd3b0     add   r0, r0, 0x68
             618 —/
```

APPARATUS AND METHODS FOR PLACING A MANAGED HEAP

FIELD OF THE DISCLOSURE

The present disclosure relates generally to memory allocation, and more particularly, to methods and apparatus for placing a managed heap in memory.

BACKGROUND

The need for increased software application portability (i.e., the ability to execute a given software application on a variety of platforms having different hardware, operating systems, etc.), as well as the need to reduce time to market for independent software vendors (ISVs), have resulted in increased development and usage of managed runtime environments.

Managed runtime environments are typically implemented using a dynamic programming language such as, for example, Java, C#, etc. A software engine (e.g., a Java Virtual Machine (JVM), Common Language Runtime (CLR), etc.), which is commonly referred to as a runtime environment, executes the dynamic program language instructions. The runtime environment interposes or interfaces between dynamic program language instructions (e.g., a Java program or source code) to be executed and the target execution platform (i.e., the hardware and operating system(s) of the computer executing the dynamic program) so that the dynamic program can be executed in a platform independent manner.

Dynamic program language instructions (e.g., Java instructions) are not statically compiled and linked directly into native or machine code for execution by the target platform (i.e., the operating system and hardware of the target processing system or platform). Instead, dynamic program language instructions are statically compiled into an intermediate language (e.g., bytecodes) and the intermediate language may be interpreted or subsequently compiled by a just-in-time (JIT) compiler into native code or machine code that can be executed by the target processing system or platform. Typically, the JIT compiler is provided by a runtime environment that is hosted by the operating system of a target processing platform such as, for example, a computer system. Thus, the runtime environment and, in particular, the JIT compiler, translates platform independent program instructions (e.g., Java bytecodes, C# bytecodes, etc.) into native code (i.e., machine code that can be executed by an underlying target processing system or platform).

In order to allow programmers to dynamically allocate memory without being concerned with memory management issues, dynamic programming languages such as, for example, Java, C#, etc., use a garbage collection memory management system to allocate and free memory. The garbage collection memory management system will allocate and free memory from an area of the heap known as the managed heap. The managed heap is allocated and placed within the heap during the system initialization phase. In the prior art, the managed heap is placed near the top of the heap; immediately below the stack region.

BRIEF DESCRIPTION OF THE DRAWINGS

FIG. 5(*a*) is a diagram illustrating a prior art set of machine accessible instructions associated with accessing a text segment of memory from a managed heap.

FIG. 5(*b*) is a diagram illustrating a set of machine accessible instructions associated with accessing a text segment of memory from an intelligently placed managed heap.

FIG. 6(*a*) is a diagram illustrating a set of prior art machine accessible instructions associated with constructing a pointer for a pointer access within a managed heap.

FIG. 6(*b*) is a diagram illustrating a set of machine accessible instructions associated with constructing a pointer for a pointer access within an intelligently placed managed heap.

FIG. 10(*b*) is a diagram illustrating a set of machine accessible instructions associated with constructing a pointer when the managed heap is intelligently placed.

DETAILED DESCRIPTION

Figure 1:
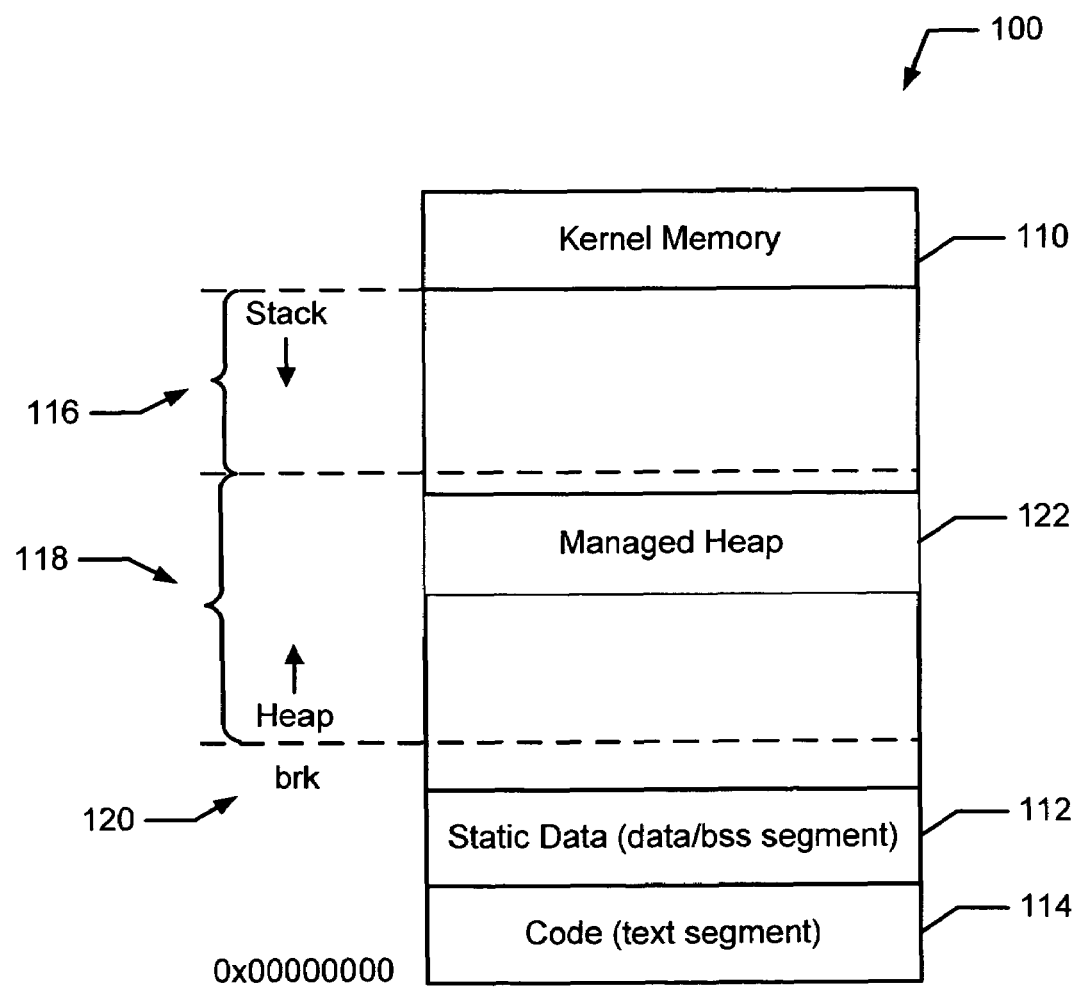
FIG. 1 is a diagram illustrating a prior art memory map.

FIG. 1 is a diagram illustrating an example prior art memory map 100 containing a kernel memory region 110, a static data region (data/block started by symbol [bss] segment) 112, and a code region (text segment) 114. The kernel memory region contains the operating system kernel. The static data region contains static data, (i.e., objects whose sizes are known to the compiler and whose lifetimes—an interval during which a program can access them—are the entire execution of a program). The code region 114 (text segment) may contain code and constant data associated with a program.

The basic memory map of FIG. 1 also contains a stack region 116 and a heap region 118. The stack region 116 and heap region 118 both contain dynamically allocated memory. The stack region 116 contains stack frames that have been dynamically allocated. Memory allocated in the stack region is retrieved beginning from a location just below the kernel region. The stack region grows from a high address to a lower address. In contrast, the heap region 118 contains variables manually allocated by a programmer using, for example, a C malloc call, or a Java new call, or any other method of allocating memory. A memory manager determines where memory is allocated from the heap region 118. The memory allocated from the heap region 118 is allocated above the program break, brk 120. Persons of ordinary skill in the art will readily appreciate that brk 120 denotes a break value which is a first addressable region in the heap beyond the static data region. The location of the managed heap 122 in the heap region 118 is allocated by the memory manager at a runtime initialization phase via a malloc call or any other means of allocating memory. This typically results in the managed heap being placed more than one gigabyte away from the static data region 112, near the top of the heap region 118.

Figure 2:
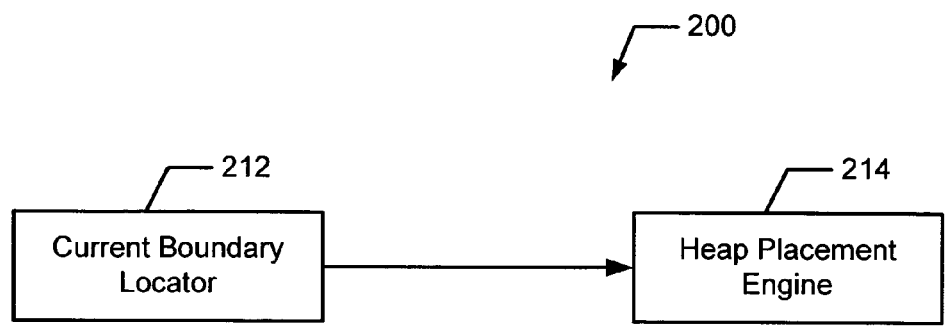
FIG. 2 is a schematic illustration of an example apparatus to intelligently place a managed heap in memory according to an embodiment of the invention.
Figure 3:
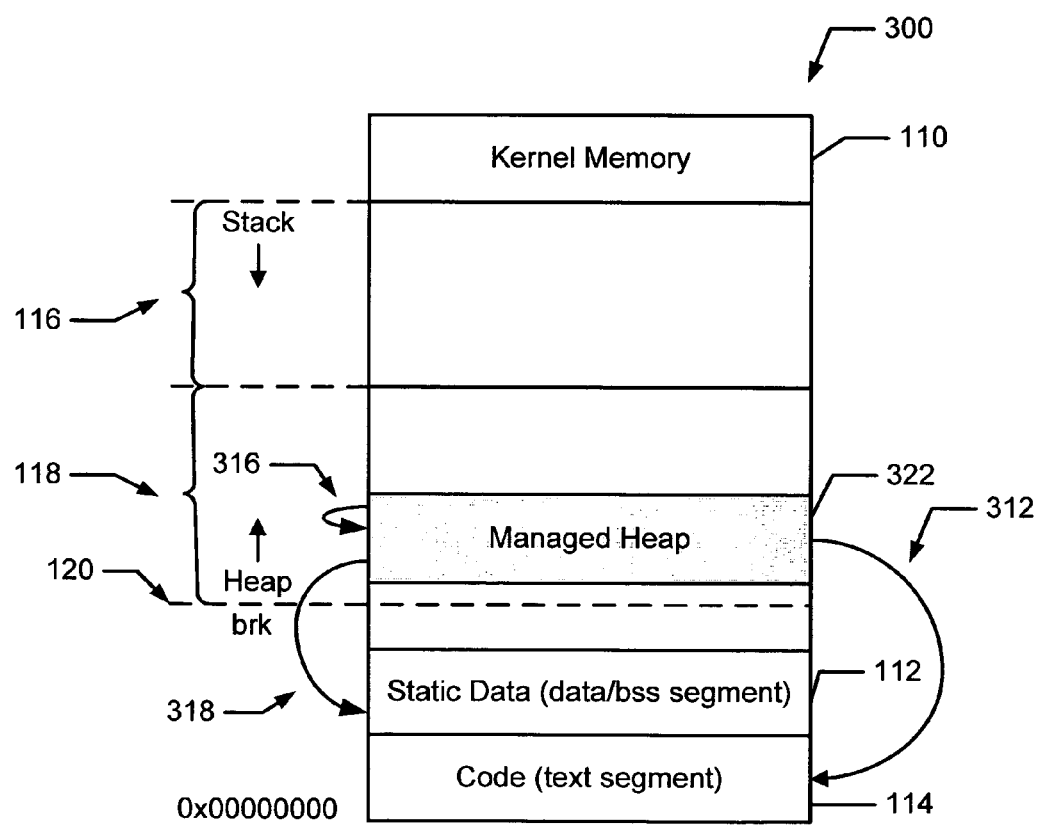
FIG. 3 is a diagram illustrating a memory map after intelligent heap placement.

FIG. 2 is a schematic illustration of an example apparatus to intelligently place (locate) a managed heap 322 in memory 300, as shown in FIG. 3. FIG. 3 illustrates an example memory map 300 after the managed heap 322 has been intelligently placed by the apparatus of FIG. 2. As with the prior art memory map of FIG. 1, the memory map of FIG. 3 includes a Kernel memory 110, a stack region 116, a heap region 118, a program break 120, a static data segment 112 and a code segment 114. However, unlike the prior art memory map of FIG. 1, the managed heap 322 is placed lower in the heap region 118 by the apparatus 200.

To intelligently place the managed heap 322 in the heap region 118, the apparatus 200 is provided with a current boundary identifier 212 and a heap placement engine 214. The current boundary identifier 212 identifies the current boundary between a static region 112 of memory 300 and a dynamic region 118 of memory 300, (i.e., the upper bound of the static data region 112). The heap placement engine 214 then determines a safeguard distance from the upper bound of the static data region 112 of memory 300. The safeguard distance may be a sum of a maximum growth amount of the static data region 112 of memory 300 and a safeguard size defined by a program developer. The heap placement engine 214 allocates an area of memory 300 having a lower boundary at a location that is the safeguard distance above the upper boundary of the static region 112 of memory as the managed heap 322.

Figure 4:
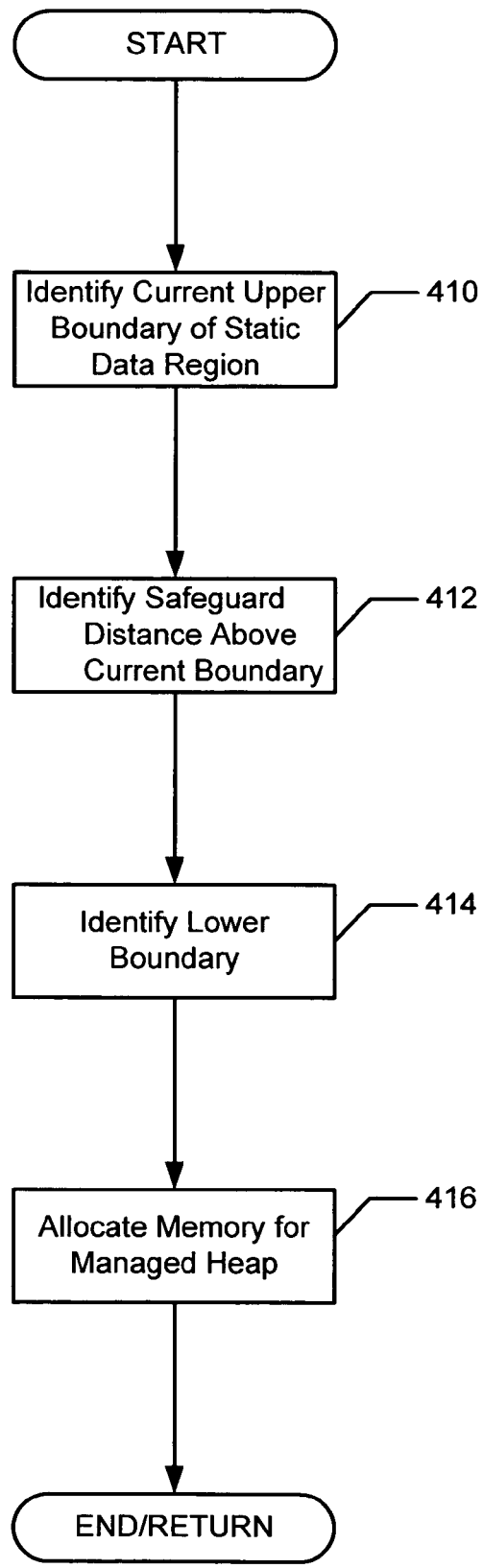
FIG. 4 is a flow chart representative of machine accessible instructions which may be executed by a processor to implement the apparatus of FIG. 2.

A flowchart representative of example machine accessible instructions for implementing the apparatus 200 of FIG. 2 is shown in FIG. 4. In this example, the machine accessible instructions comprise a program for execution by a processor such as the processor 1122 shown in the example computer 1120 discussed below in connection with FIG. 11. The program may be embodied in software stored on a tangible medium such as a CD-ROM, a floppy disk, a hard drive, a digital versatile disk (DVD), or a memory associated with the processor 1122, but persons of ordinary skill in the art will readily appreciate that the entire program and/or parts thereof could alternatively be executed by a device other than the processor 1122 and/or embodied in firmware or dedicated hardware in a well known manner. For example, any or all of the current boundary locator 212 and the heap placement engine 214 could be implemented by software, hardware, and/or firmware. Further, although the example program is described with reference to the flowchart illustrated in FIG. 4, persons of ordinary skill in the art will readily appreciate that many other methods of implementing the example apparatus 200 may alternatively be used. For example, the order of execution of the blocks may be changed, and/or some of the blocks described may be changed, eliminated, or combined.

The program of FIG. 4 begins at block 410 where the current boundary locator 212 identifies the current upper boundary of the static data region 112 (block 410). The current boundary locator 212 may identify the current upper boundary via a UNIX® system call, such as, for example, sbrk(0). The current upper boundary may also be determined using binary image introspection. Those of ordinary skill in the art will readily recognize that binary introspection is a method of determining the text, data, and code segment by analyzing a binary executable file based on the binary executable file format (e.g., Portable Executable, Executable and Linkable Format, etc.). The call sbrk(0) will return the address of the program break 120. As noted earlier this is a first addressable region in the heap region 118 beyond the static data region 112.

After the current upper boundary is identified (block 410), the heap placement engine 214 identifies a safeguard distance above the identified upper boundary of the static data region 112 (block 412). The safeguard distance should be set to slightly exceed the maximum expansion size of the static data region 112. The static data region 112 may be expanded using a system call, such as, for example sbrk. However, a system developer is the one who would invoke a system call to expand the static data region 112. Therefore, the system developer controls any increase in the size of the static data region 112. Hence, the system developer can set the maximum expansion size to a desired amount. The system developer can then set the safeguard distance to be the same or slightly larger than the expansion amount.

After the safeguard distance is selected (block 412), the heap placement engine 214 identifies a lower boundary at which to place the managed heap (block 414). This lower boundary may be the sum of the address of the program break identified in block 410 and the safeguard distance identified in block 412. Memory may then be allocated for the managed heap 322 such that the lowest address in the managed heap 322 is located at the lower boundary (block 416).

Although the above examples have involved UNIX® system calls, system calls from any type of operating system that employs a managed heap may be used in place of UNIX® system calls. In other words, the apparatus 200 for intelligently placing a managed heap may be used on any operating system that employs a managed heap.

An ARM™ instruction set (supplied by the ARM™ corporation) will be used to illustrate the difference between machine accessible instructions generated by a compiler operating on a memory with a managed heap placed in accordance with the prior art, and machine accessible instructions generated by a compiler operating on a memory 300 containing an intelligently placed managed heap 322. To aid in the explanation, FIG. 3 depicts three different types of memory references that may be attempted from the managed heap 322. A first example 312 depicts a memory reference from the managed heap 322 to the code segment 114. This may occur if, for example, a JIT compiled method invokes a Java Virtual Machine (JVM) helper function. A second example 316 depicts a reference within the managed heap 322. This may occur if, for example, a first JIT compiled method invokes a second JIT compiled method, a JIT compiled method refers to a managed object, or a first managed object refers to a second managed object. A third example 318 depicts a reference from the managed heap 322 to the static data region 112. This may occur if, for example, a JIT compiled method refers to the static data region 112 or a managed object refers to the static data region 112.

One of ordinary skill in the art will readily recognize that the ARM™ instruction set cannot generate direct calls when the distance between the referenced memory address and the referee memory address is greater than thirty two megabytes. Further, one of ordinary skill in the art will readily recognize that a direct call will have a substantially shorter instruction sequence when the ARM™ instruction set is used. In the prior art, a memory reference made from the managed heap 122 (see FIG. 1) to the code segment 114 spanned a distance greater than thirty two megabytes. Therefore, a reference of this type would result in an indirect call.

FIG. 5(a) illustrates example machine accessible instructions generated by a compiler for a memory reference made from the conventionally placed managed heap 122 to the code segment 114. This particular example is a plurality of machine accessible instructions generated for a call to a VM helper routine, checkcast. In contrast, FIG. 5(b) depicts a plurality of machine accessible instructions generated by the same compiler when the managed heap 322 is intelligently placed as shown in FIG. 3. The main components of interest in this diagram are the address space where the machine accessible instructions reside and the compiler generated machine accessible instructions.

The address space where the compiler generated machine accessible instructions reside is indicated by the left hand column 514 of FIG. 5(a) and the left hand column 516 of FIG. 5(b). In the example of FIG. 5(a) wherein the managed heap 122 is conventionally placed near the top of the heap region 118, the compiler generated machine accessible instructions begin at address 0x401cf274 and end at address 0x401cf280. In contrast, when the managed heap 322 is intelligently placed as shown in FIG. 3, the compiler generated machine accessible instructions reside at a lower address space.

In this example, the compiler generated machine accessible instructions reside at address 0x4cd3ac. As most easily seen in the example of FIG. 5(b), the VM helper function resides at the address 0x1cbc8. Therefore, the generated machine accessible instructions in the example of FIG. 5(a) reside 0x401b26ac bytes from the checkcast routine, beyond the thirty two megabyte limit for generating direct calls. In contrast, the generated machine accessible instructions 516 illustrated in FIG. 5(b) reside 0x4b07e4 bytes from the checkcast helper routine, within the thirty two megabyte limit for generating direct calls.

The right hand column 518 of FIG. 5(a) shows the compiler generated machine accessible instructions associated with a call to the VM helper routine checkcast when the managed heap 122 is placed in a conventional manner. Because the generated machine accessible instructions reside more than thirty two megabytes from the routine checkcast, an invocation of the checkcast routine must be done with an indirect call. In this example, constraints on the ARM™ instruction set cause the indirect call to be done in at least four instructions. In contrast, in the example of FIG. 5(b) where the managed heap 322 has been intelligently placed by the apparatus 200, because the compiler generated machine accessible instructions reside within thirty two megabytes of the checkcast routine, a call to the checkcast routine can be made with a direct call comprising only one line of machine accessible instruction. Therefore, by placing the managed heap 322 at a lower address space, fewer compiler generated instructions are needed when a reference is made from the managed heap 322 to the code segment 114. Ultimately, fewer instructions result in a code space savings for the users of dynamic programming languages that employ a managed heap, such as, Java. Further, using a direct call or branch may minimize the penalties associated with memory and computing constrained architectures, such as, failed branch predictions, and pipe-line flushing.

A second example of a reference that may be made by the compiler generated machine accessible instructions residing in the managed heap is JIT compiled code referring to fixed managed objects that reside in the managed heap, (i.e., making a memory reference within the managed heap 122, 322). Such a reference 316 is shown in FIG. 3. The compiler generated machine accessible instructions of the managed heap 122, 322 may refer to managed objects either by loading a literal value from a literal pool or by constructing an immediate value. Those of ordinary skill in the art will readily recognize that a literal value is a constant variable made available to a program by inclusion in the executable text. Further, those of ordinary skill in the art will readily appreciate that a literal pool is a portion of memory set aside for constants. Those of ordinary skill in the art will further recognize that an immediate value is a value that is given in the program code, instead of being loaded from another location. For example, a load instruction that used a variable would have to retrieve the value of the variable. In contrast, if the immediate value (e.g., 0x123) is loaded into a register, the immediate value (e.g., 0x123) will not have to be retrieved from another area of program code. If compiler generated machine accessible instructions of the managed heap 122, 322 refer to managed objects using a literal value, then memory access penalties and cache misses may occur because the value is stored in code space, not data space.

Constructing an immediate value is another method of making a memory reference within a managed heap. Example machine accessible instructions that are generated to construct an immediate value are shown in FIG. 6(a) and FIG. 6(b). FIG. 6(a) shows machine accessible instructions that may be generated when the managed heap is placed in a conventional, prior art location. In the example of FIG. 6(a) machine accessible instructions generated in these circumstances include four lines 616. In contrast, in the example of FIG. 6(a) machine accessible instructions used to construct an address within a managed heap 322 that was placed using the apparatus 200 include only two lines. The intelligently placed managed heap 322 results in a shorter instruction sequence because the addresses being constructed are smaller.

In FIG. 6(a), the address being constructed is 0x41102c68. The compiler generated machine accessible instructions 616 constructs an immediate value representing this address using four instructions. The address being constructed is too large for the compiler to deploy a set of heuristic rules to generate the immediate value using fewer instructions. The address used in the intelligently placed managed heap 322 context is 0x12c68. The addresses of managed objects within the intelligently placed managed heap 322 are smaller because the intelligently placed managed heap 322 resides at a lower address space where addresses are by definition, smaller. Because the addresses are smaller, the compiler may deploy a set of heuristic rules to generate fewer instructions when constructing the immediate value. For example, the generated machine accessible instructions in FIG. 6(b) are able to construct the address in two instructions 618. Fewer instructions result in a savings of code space for users of dynamic programming languages that employ a managed heap, such as, Java.

Another advantage that may be gained by intelligently placing the managed 322 heap is an opportunity to compress thirty two bit pointers that either refer to objects within the managed heap 322, or thirty two bit pointers in the managed heap that refer to the static data segment 122.

An intelligently placed managed heap 322 resides at an address space low enough that it may be addressed using a sixteen bit pointer. That is, the addresses of the managed heap 322 are all small enough to fit into sixteen bits. Consequently, thirty two bit pointers referring to objects within the managed heap 322 can be broken into two sixteen bit segments; a sixteen bit offset and a sixteen bit base. The sixteen bit offset is used to address the managed heap. A sixteen bit offset may address a sixty four kilobyte range of the managed heap. There is no need to store the sixteen bit base because addresses within the intelligently placed managed heap 322 all have a common sixteen bit base. Therefore, addresses within the intelligently placed managed heap 322 can be constructed from the stored sixteen bit offset and the common sixteen bit base. This reduction in pointer size achieves a code savings space compared to a managed heap 122 that is not intelligently placed because the sixteen bit base of each 32 bit pointer in the managed heap 322 does not need to be stored.

Figure 7:
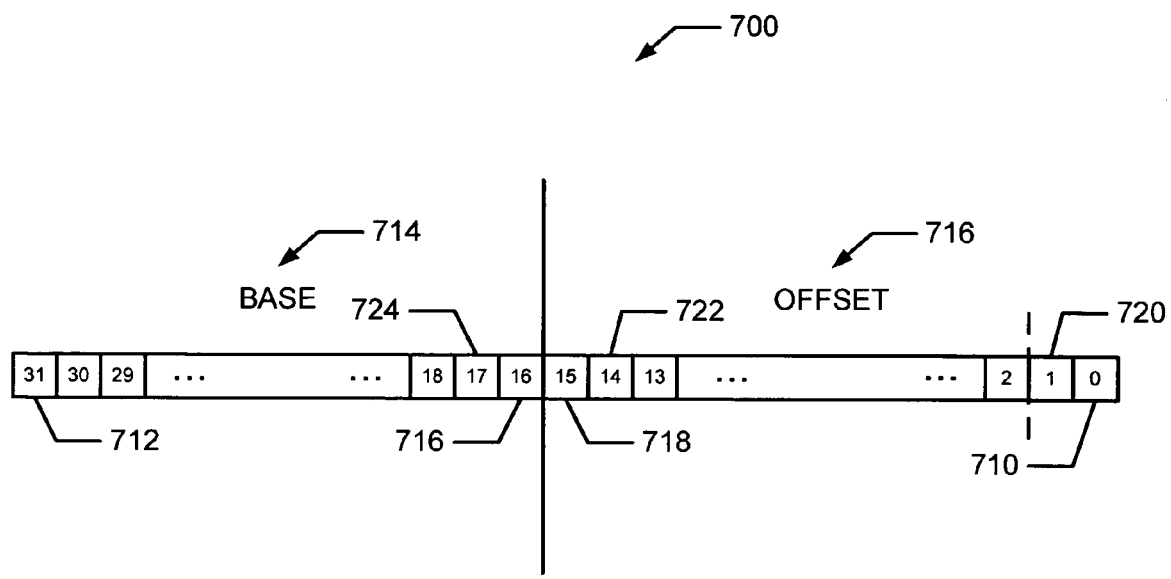
FIG. 7 is a diagram illustrating a sample memory word layout of an example managed pointer.

FIG. 7 depicts a layout of a thirty two bit pointer as an address in a managed heap. To provide reference, the bits of the thirty two bit pointer have been labeled zero 710 through thirty one 712. The thirty two bit pointer may be separated into a base 714 and an offset 716. The base 714 may span bits sixteen 716 through thirty one 712, and the offset may span bits zero 710 through fifteen 718. As explained in the above example, because of the relatively small addresses allocated to the intelligently placed managed heap 322, the upper sixteen bits (i.e., the base 714) are identical for each of the addresses in the managed heap 322 and can be ignored.

A further savings in memory storage space may be achieved based on a byte alignment enforced by a memory management module (garbage collector). If the memory management module enforces a four byte alignment of memory, then the two least significant bits of a pointer to an address within the intelligently placed managed heap 322 do not have to be stored. The two least significant bits of FIG. 7 are bits 0 710 and 1 720. One of ordinary skill in the art will readily recognize that a four byte aligned memory addressing scheme means that only memory addresses divisible by four may be addressed. If the memory containing the managed heap 322 is four byte aligned, the two least significant bits of all allowable addresses will end in the same bit pattern. Because the two least significant bits of all addresses end in the same bit pattern, there is no need to store these two bits. This bit savings could be extended to any magnitude of byte aligned memory. For example, the three least significant bits of a six byte aligned memory do not need to be stored; the four least significant bits of in an eight byte aligned memory do not have to be stored; etc. If the managed heap 322 is four byte aligned, then the offset may comprise fourteen bits. A sixteen bit offset may be formed by shifting the offset two bits to the right and filling bits fourteen 722 and fifteen 718 of the offset with bits sixteen 716 and seventeen 724 of the base, respectively. This newly formed sixteen bit offset may be used to address a range of managed heap memory as large as 256 kilobytes. For circumstances with other memory byte alignments, a different number of bits from the base may be merged with the offset.

Figure 8:
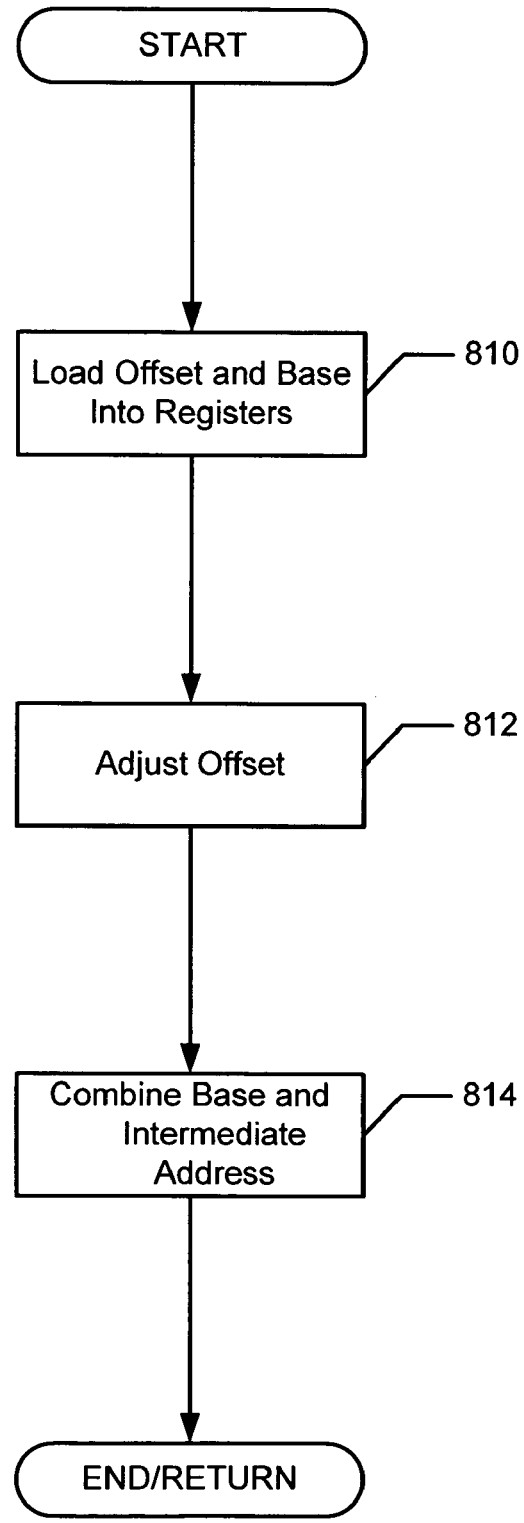
FIG. 8 is a flow chart representing example machine accessible instructions that may be executed to construct a managed pointer.

A flowchart representative of example machine accessible instructions for constructing a pointer to an address in an intelligently placed managed heap 322 is shown in FIG. 8. In this example, the machine accessible instructions comprise a program for execution by a processor such as the processor 1122 shown in the example computer 1120 discussed below in connection with FIG. 11. The program may be embodied in software stored on a tangible medium such as a CD-ROM, a floppy disk, a hard drive, a digital versatile disk (DVD), or a memory associated with the processor 1122, but persons of ordinary skill in the art will readily appreciate that the entire program and/or parts thereof could alternatively be executed by a device other than the processor 1122 and/or embodied in firmware or dedicated hardware in a well known manner. Further, although the example program is described with reference to the flowchart illustrated in FIG. 8, persons of ordinary skill in the art will readily appreciate that many other methods of constructing a pointer may alternatively be used. For example, the order of execution of the blocks may be changed, and/or some of the blocks described may be changed, eliminated, or combined.

The pointer construction program of FIG. 8 constructs a thirty two bit pointer to an address that resides in an intelligently placed managed heap 322. Initially, the program of FIG. 8 loads an offset portion of the pointer into a first register and a base portion of the pointer into a second register (block 810). The offset is adjusted based on a memory byte alignment (block 812) to arrive at an intermediate address. For example, if a memory is four byte aligned then two known bits are added to the least significant portion of the offset. This may be accomplished, for example, by shifting the offset left two bits. The intermediate address is added to the base (block 814) to create a thirty two bit pointer that may be used to address an intelligently placed heap 322.

Figure 9:
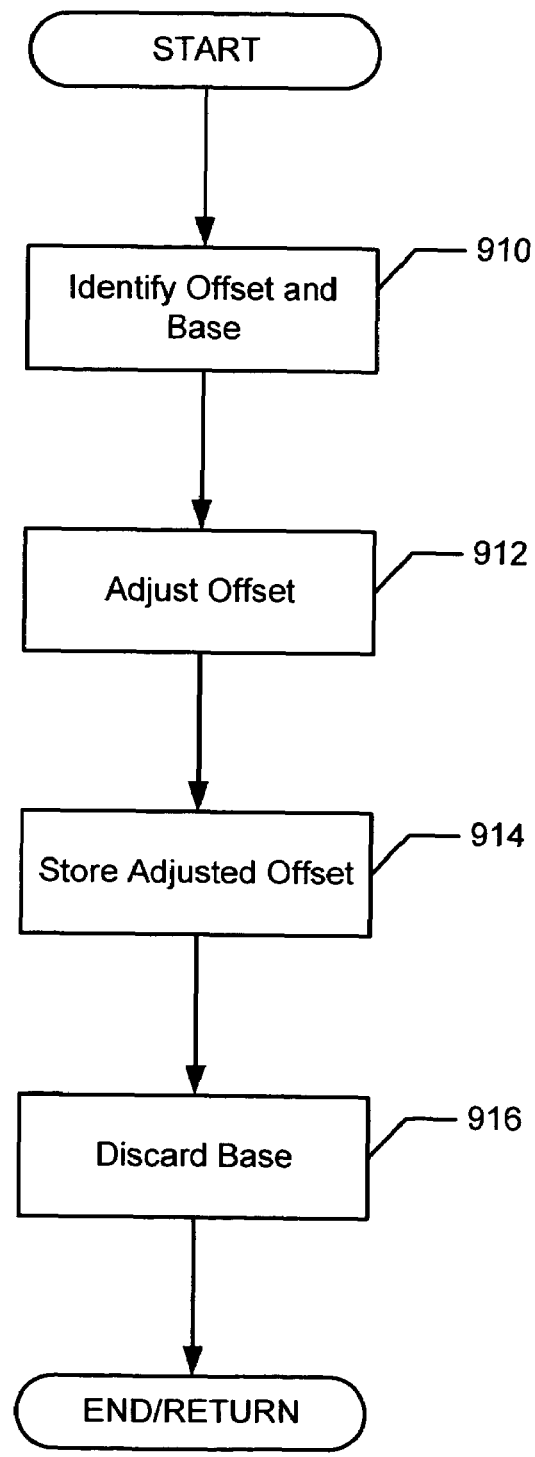
FIG. 9 is a flow chart representing example machine accessible instructions that may be executed to compress a managed pointer.

A flowchart representative of example machine accessible instructions for compressing a pointer to an address in an intelligently placed managed heap 322 is shown in FIG. 9. In this example, the machine accessible instructions comprise a program for execution by a processor such as the processor 1122 shown in the example computer 1120 discussed below in connection with FIG. 11. The program may be embodied in software stored on a tangible medium such as a CD-ROM, a floppy disk, a hard drive, a digital versatile disk (DVD), or a memory associated with the processor 1122, but persons of ordinary skill in the art will readily appreciate that the entire program and/or parts thereof could alternatively be executed by a device other than the processor 1122 and/or embodied in firmware or dedicated hardware in a well known manner. Further, although the example program is described with reference to the flowchart illustrated in FIG. 9, persons of ordinary skill in the art will readily appreciate that many other methods of constructing a pointer may alternatively be used. For example, the order of execution of the blocks may be changed, and/or some of the blocks described may be changed, eliminated, or combined.

The pointer compression program of FIG. 9 compresses a thirty two bit pointer that may reside in the managed heap. Initially, the program of FIG. 9 identifies an offset and base portion of a thirty two bit pointer (block 910). For example, the pointer is divided into a sixteen bit base and a sixteen bit offset. However, an implementer of this program may choose a base and offset bit-size as needed. The identified offset is adjusted (block 912) based on a byte alignment of memory. As previously described, if memory is four byte aligned, then the two least significant bits of the offset 710, 720 may be discarded, and the two least significant bits of the base 716, 724 are shifted to the two most significant bits of the offset 718, 722. The adjusted offset is stored (block 914). A common base value is identified and stored during heap 118 initialization, therefore storing the base portion of the pointer is not necessary. The base portion of the pointer is discarded (block 916).

FIG. 10(a) illustrates example machine accessible instructions 1000 generated by a compiler for a pointer construction associated with a conventionally placed managed heap.

FIG. 10(b) illustrates example machine accessible instructions 1010 generated by a compiler for a pointer construction associated with an intelligently placed managed heap 322. A machine accessible instruction 1012 loads the sixteen bit offset portion of a thirty two bit pointer into a first register. A machine accessible instruction 1014 loads the base into a second register. The offset is shifted 1016 to account for the byte alignment of memory, and adding the offset to the base completes construction of the thirty two bit pointer.

Figure 10:
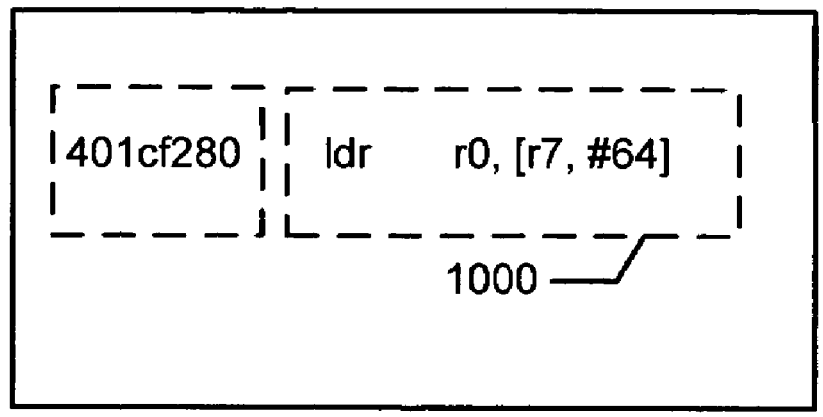
FIG. 10(*a*) is a diagram illustrating a set of prior art machine accessible instructions associated with constructing a managed heap pointer.
Figure 10:
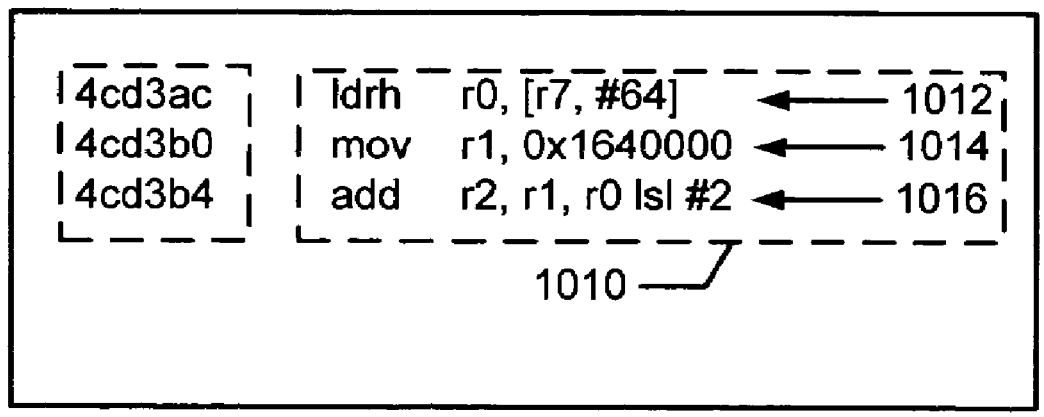

Although the construction of a pointer consumes two more instructions in the example of FIG. 10(*b*) than in the prior art example of FIG. 10(*a*), there is a storage savings of at least sixteen bits for each thirty two bit pointer when using an intelligently placed managed heap 322. Further, a compiler code scheduling mechanism may alleviate or hide an execution time cost associated with the two additional instructions. The compiler may further amortize the execution time cost by reserving a register for the heap base. The register may be reserved across multiple compressed pointer fetches.

Figure 11:
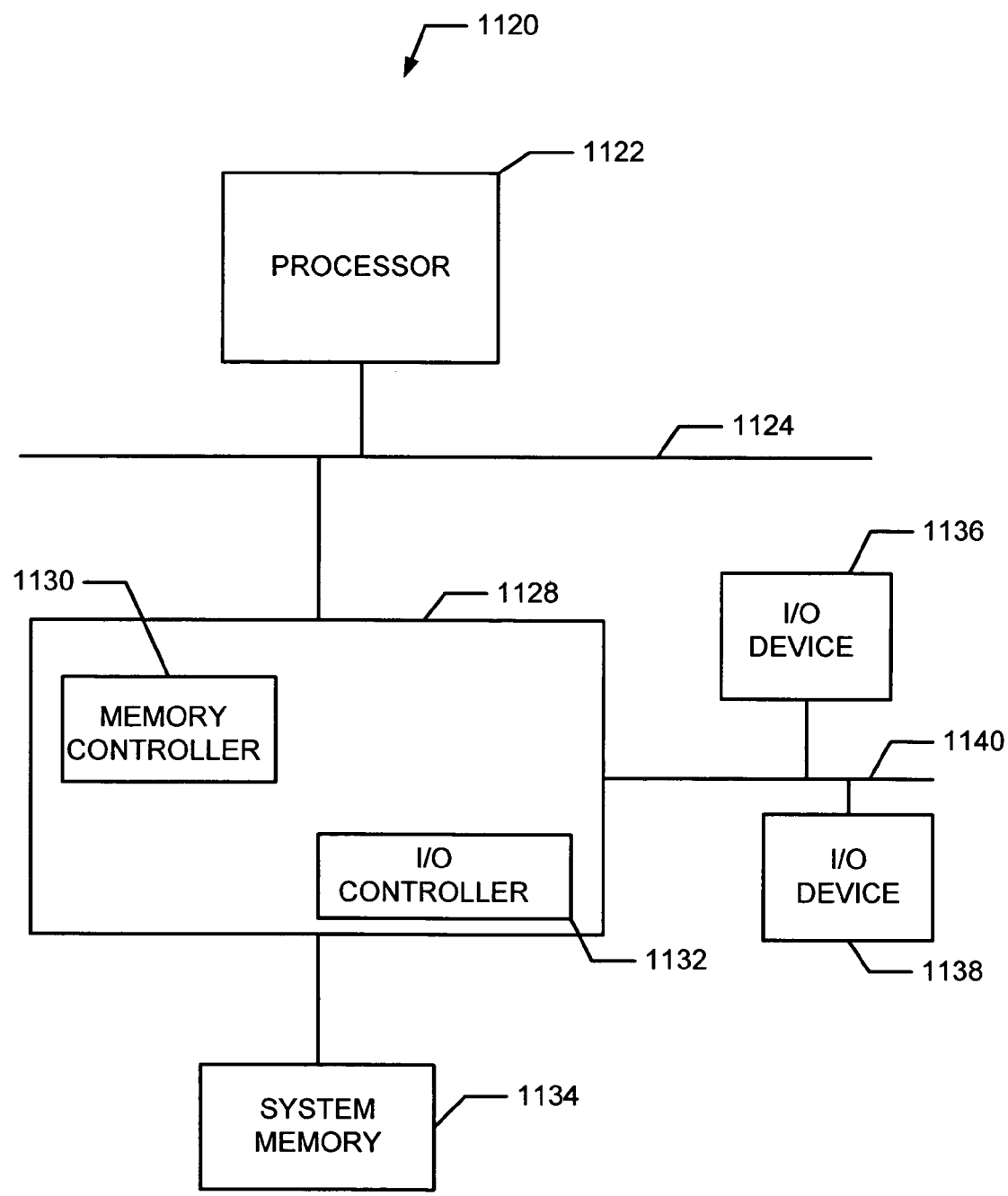
FIG. 11 is a diagram of an example processor system that may be used to implement the apparatus and methods described herein.

FIG. 11 is a block diagram of an example processor system 1120 that may be used to implement the apparatus and methods described herein. For example, the methods described herein may be implemented as instructions stored on a memory and executed by a processor coupled to the memory. As shown in FIG. 11, the processor system 1120 includes a processor 1122 that is coupled to an interconnection bus or network 1124. The processor 1122 may be any suitable processor, processing unit or microprocessor such as, for example, a processor from the Intel Itanium® family, Intel X-Scale® family, the Intel Pentium® family, the Intel Centrino® family, etc. Although not shown in FIG. 11, the system 1120 may be a multi-processor system and, thus, may include one or more additional processors that are identical or similar to the processor 1122 and which are coupled to the interconnection bus or network 1124.

The processor 1122 of FIG. 11 is coupled to a chipset 1128, which includes a memory controller 1130 and an input/output (I/O) controller 1132. As is well known, a chipset typically provides I/O and memory management functions as well as a plurality of general purpose and/or special purpose registers, timers, etc. that are accessible to or used by one or more processors coupled to the chipset. The memory controller 1130 performs functions that enable the processor 1122 (or processors if there are multiple processors) to access a system memory 1134, which may include any desired type of volatile memory such as, for example, static random access memory (SRAM), dynamic random access memory (DRAM), etc. The I/O controller 1132 performs functions that enable the processor 1122 to communicate with peripheral input/output (I/O) devices 1136 and 1138 via an I/O bus 1140. The I/O devices 1136 and 1138 may be any desired type of I/O device such as, for example, a keyboard, a video display or monitor, a mouse, etc. While the memory controller 1130 and the I/O controller 1132 are depicted in FIG. 11 as separate functional blocks within the chipset 1128, the functions performed by these blocks may be integrated within a single semiconductor circuit or may be implemented using two or more separate integrated circuits.

Although certain methods, apparatus and articles of manufacture have been described herein, the scope of coverage of this patent is not limited thereto. To the contrary, this patent covers all methods, apparatus and articles of manufacture fairly falling within the scope of the appended claims either literally or under the doctrine of equivalents.

What is claimed is:

1. A method of placing a managed heap in a memory comprising:

identifying a current boundary of a static data region in the memory; and setting a lower boundary of the managed heap at an address located a safeguard distance above the current boundary of the static data region in the memory.

2. A method as defined in claim 1 wherein the lower boundary of the managed heap is set such that a machine accessible instruction within the managed heap addresses the static data region using an immediate value.

3. A method as defined in claim 1 wherein the lower boundary of the managed heap is set such that an immediate value of a pointer to an address in the managed heap is constructed in two instructions.

4. A method as defined in claim 1 wherein the lower boundary of the managed heap is set such that an address within a code segment of the memory is accessed using a direct branch machine accessible instruction in the managed heap.

5. A method as defined in claim 1 wherein identifying the current upper boundary of the static data region comprises determining the current boundary using binary image introspection.

6. A method as defined in claim 1 wherein identifying the current upper boundary of the static data region comprises determining the current upper boundary using a system call.

7. A method as defined in claim 1 wherein the safeguard distance is larger than a maximum growth amount of the static data region.

8. A method as defined in claim 1 wherein setting a lower boundary of the managed heap comprises summing a memory address of the current boundary of the static data region, and a maximum growth amount of the static data region.

9. A method as defined in claim 1 wherein setting the lower boundary of the managed heap is performed during a runtime initialization phase.

10. A method as defined in claim 1 further comprising generating a direct branch from Just-in Time code located in the managed heap to virtual machine code located in a static code segment.

11. A method as defined in claim 1 further comprising compressing a managed pointer to an address in the managed heap.

12. A method as defined in claim 11 wherein compressing the managed pointer comprises:

decomposing the managed pointer into a predetermined base value and an offset value; and storing the offset value.

13. A method as defined in claim 12 wherein storing the offset value comprises storing all but the last two bits of the offset value.

14. A method as defined in claim 12 wherein the managed pointer points from a first address in the managed heap to a second address in the managed heap.

15. A method as defined in claim 12 wherein the managed pointer points from an address in the managed heap to an address in the static data region.

16. A method as defined in claim 12 wherein a predetermined number of bits of the base are combined with a predetermined number of bits of the offset to address the managed heap.

17. A method as define in claim 1 further comprising constructing a managed pointer to an address in the managed heap.

18. A method as defined in claim 17 wherein constructing the managed pointer comprises constructing the managed pointer from a predetermined base and an offset value.

19. A method as defined in claim 18 further comprising adding two bits to the offset value.

20. An apparatus to place a managed heap in a memory comprising:
- a boundary locator to identify a current boundary of a static data region in the memory; and,
- a heap placement engine to set a lower boundary of the managed heap at an address located a safeguard distance above the current boundary.

21. An apparatus as defined in claim 20 wherein the safeguard distance is larger than a maximum growth amount of the static data region.

22. A compiler system comprising:
- a dynamic random access memory;
- a boundary locator to identify a current boundary of a static data region in the dynamic random access memory; and,
- a heap placement engine to set a lower boundary of a managed heap at an address in the dynamic random access memory located a safeguard distance above the current boundary.

23. A system as defined in 22 wherein the safeguard distance is larger than a maximum growth amount of the static data region.

24. A machine accessible medium containing instructions which, when executed, cause a machine to:
- identify a current boundary of a static data region in a memory; and
- set a lower boundary of the managed heap at an address located a safeguard distance above the current boundary of a static data in memory.

25. A machine accessible medium as defined in claim 24 wherein the safeguard distance is larger than a maximum growth amount of the static data region.

26. A method of constructing a pointer to an address in a managed heap comprising:
- loading an offset portion of the address;
- appending a predetermined value to the offset to generate an intermediate address; and
- combining the intermediate address with a predetermined base address of a managed heap.

27. A method as defined in claim 26 wherein the predetermined base comprises sixteen bits of the address.

28. A method as defined in claim 26 wherein combining the intermediate address with the predetermined base address comprises loading the base into a first predetermined portion of a register.

29. A method as defined in claim 26 wherein loading the offset portion comprises loading the offset portion into a second predetermined portion of the register.

30. A method as defined in claim 26 wherein appending the predetermined value comprises shifting the offset.

31. A method as defined in claim 26 wherein the predetermined value is dependent on the memory allocation structure.

* * * * *